Nov. 3, 1925.  
W. VAN E. THOMPSON  
SPRINKLER HEAD  
Filed Jan. 16, 1923  
1,559,655
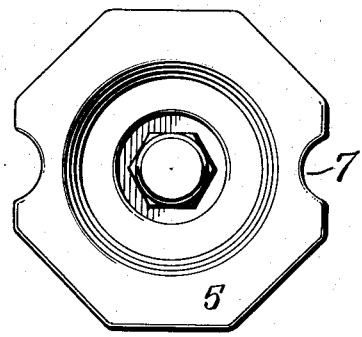
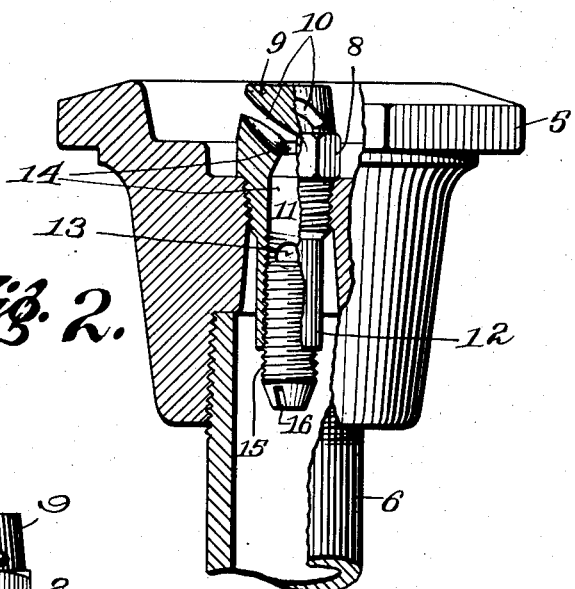
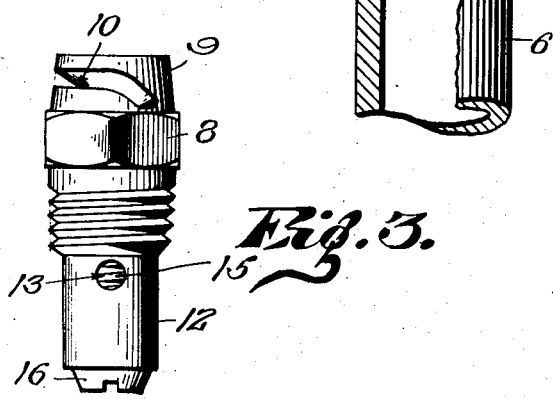
INVENTOR.  
Walter Van E. Thompson  
BY  
ATTORNEY.

Patented Nov. 3, 1925.

1,559,655

UNITED STATES PATENT OFFICE.

WALTER VAN E. THOMPSON, OF LOS ANGELES, CALIFORNIA.

SPRINKLER HEAD.

Application filed January 16, 1923. Serial No. 613,023.

*To all whom it may concern:*

Be it known that I, WALTER VAN E. THOMPSON, a citizen of the United States, residing at the city of Los Angeles, county of Los Angeles, State of California, have invented new and useful Improvements in Sprinkler Heads, of which the following is a specification.

My invention relates primarily to a sprinkler head for use in a lawn sprinkler system and the object thereof is to provide a sprinkler head in which the spray member is readily detachable from the outer casing by the use of a simple tool and contains a water control which can be regulated to supply a given quantity of water and then replaced in the casing and thereafter can be detached only by the use of a suitable tool.

A further object is to provide a form of spraying device which will deliver the water in the form of a segment of a circle either as a coarse or fine spray as desired.

In the drawings forming a part of this application, Fig. 1 is a top plan of a form of sprinkler head designed to deliver the water in a semicircle. Fig. 2 is a side elevation partly in central section of the head shown in Fig. 1 and of the top portion of a lawn pipe. Fig. 3 is a side elevation of the upper part of the spray member.

Referring to the drawings 5 is the outer casing having a central aperture extending therethrough. The lower portion of this aperture is screw threaded to enable it to be screwed upon the lawn pipe 6. The central portion of this aperture is of less diameter than the lower portion.

The upper part of the central portion of the aperture is screw threaded for the reception of the spray member. The upper portion of the aperture preferably has two steps. In the outer edge of casing 5 are oppositely disposed notches 7 for the reception of a forked wrench not shown, wherewith to position the casing on the lawn pipe. Where a semicircular spray is desired the spray member comprises a head the lower portion 8 of which is preferably hexagonal and the upper portion 9 of which is preferably the frustum of a cone. A discharge orifice 10 is milled by a hollow mill in one side of the conical portion commencing near the upper end thereof and extending rearwardly and downwardly to the junction with the hexagonal portion at a point a little back of the central vertical line. Below the head is a screw threaded neck 11 which screws into the upper portion of the casing at the central portion of the aperture therein. Below the neck the body 12 is of less diameter than the neck so as to leave a space between the body and casing 5. A transverse hole is bored through the body just below the neck and forms ports 13 for the ingress of water into the central bore 14 which extends centrally through the body, and neck and into the head. The lower portion of the bore 14 is screw threaded to a point above ports 13 for the reception of the regulating plug 15 which, when the upper end extends above ports 13 preferably projects below body 12 and has a kerf 16 therein for the reception of a tool to regulate the position of the plug in body 12. Bore 14 contracts in the head and terminates in a smaller portion which crosses orifice 10 with the rear edge of the orifice and bore coinciding.

The purpose of stepping the upper portion of the central bore of casing 5 is to render the unscrewing of the spray member very difficult except with a suitable tool whereby tampering with or unauthorized removal thereof is not likely to occur. A pressure of about 15 pounds is required to deliver the water in a semicircle. By milling orifice 10 so that the rear line thereof extends to the center of the head a spray approximately a quarter of a circle is produced under a fifteen pound pressure. It will be understood that when less pressures of water is used the water is delivered in less areas of segments of a circle. The steps in the outer casing could be omitted but in that case there would not be sufficient protection for the spray member.

Having described my invention I claim:

1. A sprinkler head comprising an outer casing having a central aperture therethrough, said aperture being of different diameters, portions of the casing forming said aperture being threaded; a spray member having a slot therein in the head thereof and a central bore of different diameters extending from near the top of the head to and through the body, said spray member being removably secured in said outer casing, said spray member having a body of less diameter than the aperture in the outer casing below its engagement with the casing and having transverse ports near the upper part of said body which is below its engagement with the casing; and being internally threaded; and an externally screw threaded plug in said body adapted to wholly or partially close said ports.

2. A sprinkler head comprising a casing adapted to be screwed upon a lawn pipe; a spray member adapted to be removably secured in said casing, said spray member having a head with an orifice terminating in a contracted inner edge and a central stepped bore extending above the orifice in the head and intercepting said orifice, and transverse ports therein, and means to regulate the flow of water through said ports.

In witness that I claim the foregoing I have hereunto subscribed my name this 9th day of January, 1923.

WALTER VAN E. THOMPSON.